(12) United States Patent
Komatsu et al.

(10) Patent No.: US 12,283,091 B2
(45) Date of Patent: Apr. 22, 2025

(54) IMAGE CLASSIFICATION DEVICE AND METHOD

(71) Applicant: Hitachi High-Tech Corporation, Tokyo (JP)

(72) Inventors: Sota Komatsu, Tokyo (JP); Masayoshi Ishikawa, Tokyo (JP); Fumihiro Bekku, Tokyo (JP); Takefumi Kakinuma, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 384 days.

(21) Appl. No.: 17/793,832

(22) PCT Filed: Nov. 6, 2020

(86) PCT No.: PCT/JP2020/041530
§ 371 (c)(1),
(2) Date: Jul. 19, 2022

(87) PCT Pub. No.: WO2021/161595
PCT Pub. Date: Aug. 19, 2021

(65) Prior Publication Data
US 2023/0058441 A1    Feb. 23, 2023

(30) Foreign Application Priority Data

Feb. 12, 2020   (JP) ................................. 2020-021469

(51) Int. Cl.
*G06V 10/774*      (2022.01)
*G06T 7/11*        (2017.01)
(Continued)

(52) U.S. Cl.
CPC .............. *G06V 10/774* (2022.01); *G06T 7/11* (2017.01); *G06V 10/762* (2022.01); *G06V 10/764* (2022.01); *G06V 10/7788* (2022.01)

(58) Field of Classification Search
None
See application file for complete search history.

(56) References Cited

U.S. PATENT DOCUMENTS

| | | | |
|---|---|---|---|
| 2010/0271395 A1 | 10/2010 | Isogai et al. | |
| 2014/0198980 A1* | 7/2014 | Fukui | G06V 20/30 382/159 |
| 2024/0362892 A1* | 10/2024 | Komatsu | G06V 10/44 |

FOREIGN PATENT DOCUMENTS

| | | |
|---|---|---|
| CN | 101889282 A | 11/2010 |
| JP | 2005-149323 A | 6/2005 |

(Continued)

OTHER PUBLICATIONS

International Search Report (PCT/ISA/210) issued in PCT Application No. PCT/JP2020/041530 dated Dec. 28, 2020 with English translation (five (5) pages).

(Continued)

*Primary Examiner* — Dov Popovici
(74) *Attorney, Agent, or Firm* — Crowell & Moring LLP (57) ABSTRACT

The objective of the present invention is to provide an image classification device and a method therefor with which suitable teaching data can be created. An image classification device that carries out image classification using images which are in a class to be classified and include teaching information, and images which are in a class not to be classified and to which teaching information has not been assigned, said image classification device being characterized by being provided with: an image group input unit for receiving inputs of an image group belonging to a class to be classified and an image group belonging to a class not to be classified; and a subclassification unit for extracting a feature amount for each image in an image group, clustering the (Continued)

feature amounts of the images in the image group belonging to a class not to be classified, and thereby dividing the images into sub-classes.

11 Claims, 6 Drawing Sheets

(51) Int. Cl.
*G06V 10/762* (2022.01)
*G06V 10/764* (2022.01)
*G06V 10/778* (2022.01)

(56) References Cited

FOREIGN PATENT DOCUMENTS

| | | |
|---|---|---|
| JP | 2006-99565 A | 4/2006 |
| JP | 2008-165572 A | 7/2008 |
| JP | 2014-135014 A | 7/2014 |
| JP | 2014-164499 A | 9/2014 |
| JP | 2019-101959 A | 6/2019 |

OTHER PUBLICATIONS

Japanese-language Written Opinion (PCT/ISA/237) issued in PCT Application No. PCT/JP2020/041530 dated Dec. 28, 2020 (four (4) pages).
Chinese language Office Action issued in Chinese Application No. 202080094984.8 dated Feb. 14, 2025 with partial English translation (18 pages).

* cited by examiner

IMAGE CLASSIFICATION DEVICE AND METHOD

TECHNICAL FIELD

The present invention relates to an image classification device and method, and more particularly, to an image classification device and method for providing teaching data used in an image classification system having a learning function.

BACKGROUND ART

An image classification system having a learning function may be configured using an image classification model such as deep learning. In a case where the image classification model such as deep learning is used, many input images and teaching information representing types of images are required as teaching data, and the teaching information is manually created by an expert in many cases.

The expert classifies the teaching data in the sense indicated by the image. At this time, images having a plurality of features may be collected in the same class. For example, there is a case where a non-classification target class in which all images other than a class (hereinafter, referred to as a classification target class) that the expert explicitly desires to classify into the image classification model are collected is created. In this case, there is a possibility that various images to be originally separated are mixed in a single class.

In this case, the presence of the class mixed with the image to be classified is not necessarily optimal in terms of classification accuracy when learning an image classifier. This is because teaching data in which one feature corresponds to one class is generally preferable because compact learning can be performed when the image classification model is learned. Therefore, in order to perform compact learning, it is necessary to divide the non-classification target class such that one feature corresponds to one class.

In an image classification field requiring teaching data, man-hours for work of dividing a non-classification target class for each feature is a problem. In PTL 1, an approach has been made in which a non-classification target class other than a classification target class is automatically divided from similarity with the classification target class using a generation model of the classification target class to reduce man-hours.

CITATION LIST

Patent Literature

PTL 1: JP 2014-135014 A

SUMMARY OF INVENTION

Technical Problem

In PTL 1, the non-classification target class is divided from the similarity with the classification target class using the generation model of the classification target class. Therefore, among the images of the non-classification target class, images having a small similarity with all the classification target classes cannot be divided, and images included in the non-classification target class cannot be divided for each feature.

Therefore, an object of the present invention is to provide an image classification device and method capable of creating appropriate teaching data by, for a class in which images having a plurality of features such as a non-classification target class are collected, dividing the class for each feature and generating the divided class as a subclass.

Solution to Problem

As described above, according to the present invention, there is provided an image classification device that performs image classification using images of a classification target class that include teaching information, and images of a non-classification target class to which the teaching information is not assigned, the image classification device including: an image group input unit that inputs an image group belonging to the classification target class and an image group belonging to the non-classification target class; and a subclassification unit that extracts features for images in the image group, clusters the features of the images for the image group belonging to the non-classification target class, and divides the image group into subclasses.

Further, there is provided an image classification method for performing image classification using images of a classification target class that include teaching information, and images of a non-classification target class to which the teaching information is not assigned, the image classification method including: extracting features for images of an image group belonging to the classification target class and an image group belonging to the non-classification target class, clustering the features of the images for the image group belonging to the non-classification target class, and dividing the image group into subclasses.

Advantageous Effects of Invention

According to the present invention, it is possible to divide the non-classification target class into subclasses for each feature. As a result, it is possible to support creation of appropriate teaching data, and reduce man-hours required for improving the accuracy of an image classification model.

DESCRIPTION OF EMBODIMENTS

Hereinafter, an embodiment of the present invention will be described in detail with reference to the drawings.

Embodiment

Figure 1:
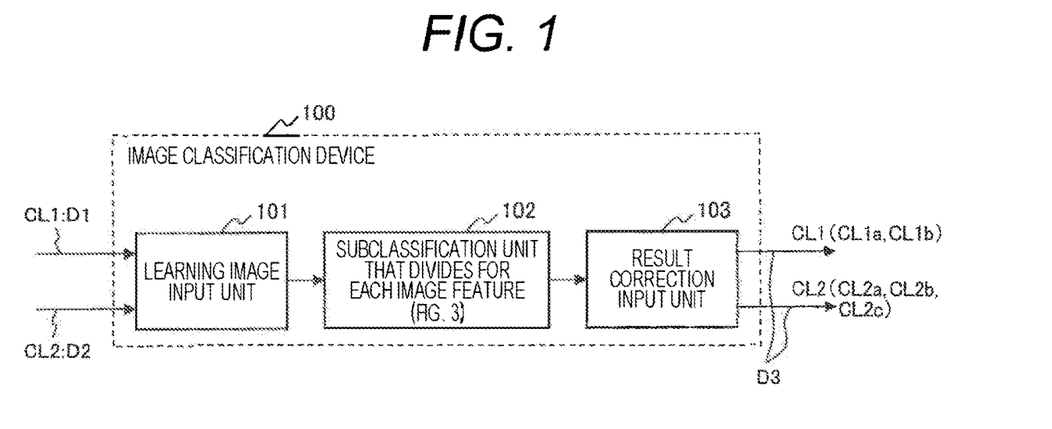
FIG. 1 is a diagram illustrating an example of an image classification device according to an embodiment of the present invention.

FIG. 1 illustrates an example of an image classification device according to an embodiment of the present invention. An image classification device 100 includes a learning image input unit 101, a subclassification unit 102 that divides for each image feature, and a result correction input unit 103, and for an image belonging to a class not to be classified, divides the class for each feature of the image to form a subclass, and a user performs result correction on the image belonging to the subclass, thereby creating a class divided correctly for each feature. The divided classes that are an output of the image classification device 100, and the images included therein are provided as teaching data in an image classification system having a learning function.

A learning image group D1 (hereinafter, a classification target image group) belonging to a class to be classified, a learning image group D2 (hereinafter, a non-classification target image group) belonging to a class not to be classified, and annotation information (not illustrated) of each belonging class are input to the learning image input unit 101. At this time, it is explicitly input that the class is a non-classification target class.

Figure 2:
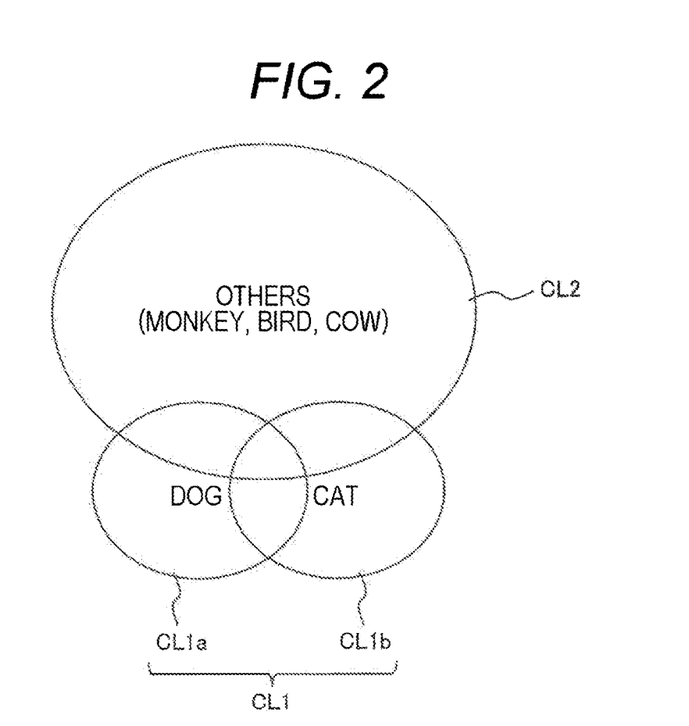
FIG. 2 is a diagram illustrating an example of a class structure of teaching data.

FIG. 2 illustrates an example of a class structure of teaching data. As an example, a learning image having three classes of image groups of "dog", "cat", and "others (monkey, bird, cow)" will be described. In this case, the user sets a "dog" class CL1a and a "cat" class CL1b as a classification target class CL1, and sets "others (monkey, bird, cow)" as a non-classification target class CL2.

In this case, since these classifications are manually performed, there may be an error. For example, it is conceivable that an image to belong to the "cat" class CL1b is included in the "dog" class CL1a, and an image to belong to the "dog" class CL1a is included in the "others (monkey, bird, cow)" class CL2. As described above, the learning image group may include noise. Note that the number of images of the "others (monkey, bird, cow)" class CL2 may be larger or smaller than that of the "dog" class CL1a or the "cat" class CL1b, and the number of images between the respective classes does not matter.

In the image classification device of FIG. 1, a method of the learning image input unit 101 is not limited as long as the non-classification target image group D2 is uniquely determined. For example, the classification target class CL1 and all image groups serving as teaching data may be given. At that time, it is assumed that an image group obtained by subtracting images belonging to the classification target class CL1 from all image groups belongs to the non-classification target class CL2.

The subclassification unit 102 that divides for each image feature divides the non-classification target class CL2 for each image feature. In the example illustrated in FIG. 2, the "others" class CL2 is divided into a "monkey" subclass CL2a, a "bird" subclass CL2b, and a "cow" subclass CL2c. Note that the divided "monkey", "bird", and "cow" classes are positioned as subclasses in the "others" class CL2. At this time, all the classes may not be divided into correct classes, and may include errors. When an error is included, the result correction input unit 103 performs correction by the user.

The result correction input unit 103 gives information D3 of a class including the subclasses defined in the subclassification unit 102 or subclasses obtained by reviewing the subclasses by the user. The class information D3 includes, in addition to the "dog" class CL1a and the "cat" class CL1b that are the classification target class CL1, image groups of the "monkey" subclass CL2a, the "bird" subclass CL2b, and the "cow" subclass CL2c obtained by subclassifying the "others (monkey, bird, cow)" that is non-classification target class CL2, and teaching information thereof, and is provided as teaching data in an image classification system having a learning function.

Figure 3:
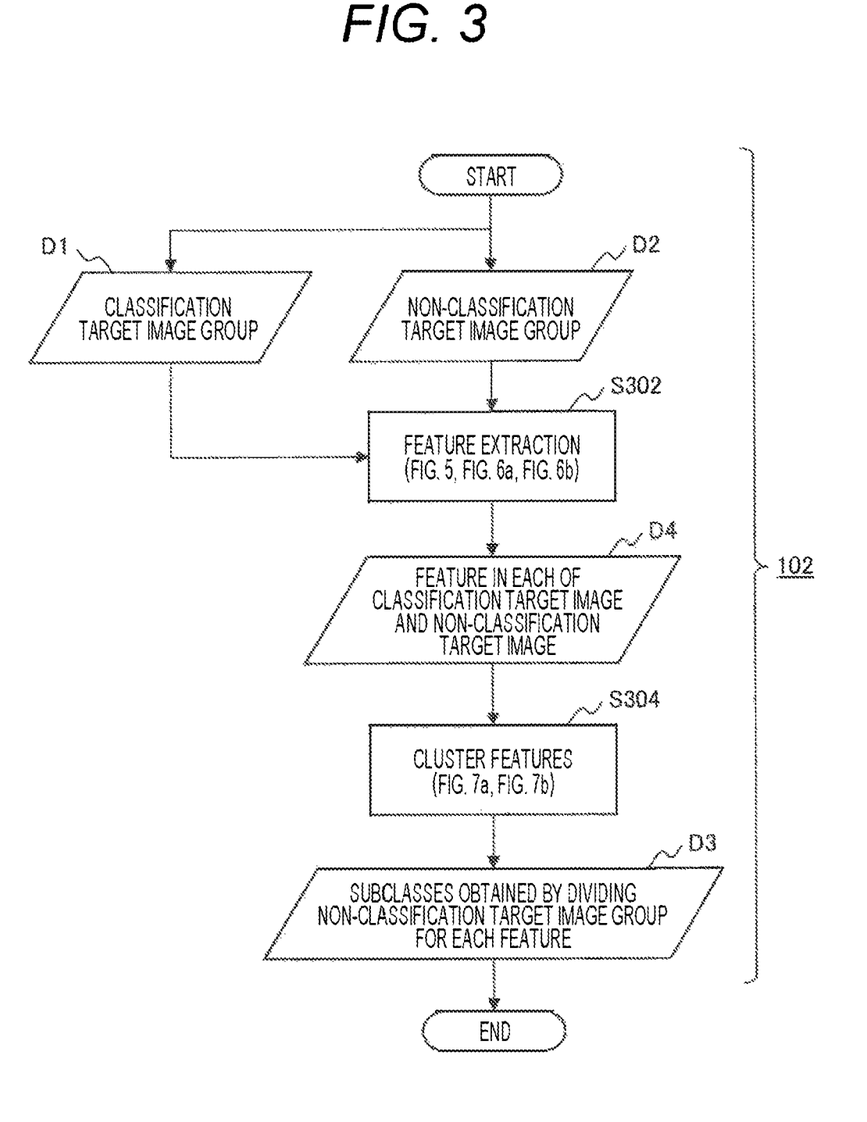
FIG. 3 is a diagram illustrating an example of a processing procedure of subclassification processing for realizing a subclassification unit.

FIG. 3 is a diagram for describing a processing procedure example of subclassification processing for realizing the subclassification unit 102 that divides for each image feature. In processing step S302, which is the first processing in a series of pieces of processing in FIG. 3, the classification target image group D1 and the non-classification target image group D2 are input, and a feature is extracted for each image forming the image groups. Information D4 obtained in processing step S302 is features in respective individual images in the classification target image group D1 and the non-classification target image group D2. Specific processing contents of processing step S302 will be described later with reference to FIGS. 5, 6a, and 6b.

Next, in processing step S304, the features are clustered to obtain information D3 of the subclasses obtained by dividing the non-classification target image group D2 for each feature. Specific processing contents of processing step S304 will be described later with reference to FIGS. 7a and 7b.

A representative case of the feature extraction processing in processing step S302 will be described with reference to FIGS. 5, 6a, and 6b. As a representative method of extracting the feature in processing step S302, a method is known in which the entire image is subdivided into minute regions, for example, in a matrix, and each pixel that is a subdivided small region is quantified by labeling, and the feature in the image and the region indicating the feature are clarified by identification using the quantified value. According to this method, in a case where a feature is present in an image that is usually configured mainly with background information, it is possible to extract the feature and the part or shape of the feature.

In such extraction processing, in the information D3 of the feature output in processing step S302, the feature is extracted so that a feature (for example, a background) common to all the images is excluded from the non-classification target image group D2. In this case, the feature represents a part other than the background, and features of the images including the same object have close values. For example, the feature extraction may be performed using a convolutional neural network (CNN). Alternatively, a method such as principal component analysis may be used, or a method combining the CNN and the principal component analysis may be used.

In processing step S302, before the feature extraction is performed, a region to be focused in the image may be obtained in advance, and the feature extraction may be performed by focusing on the region. For example, an attention region may be manually set in the non-classification target image, or the attention region may be automatically set.

Figure 5:
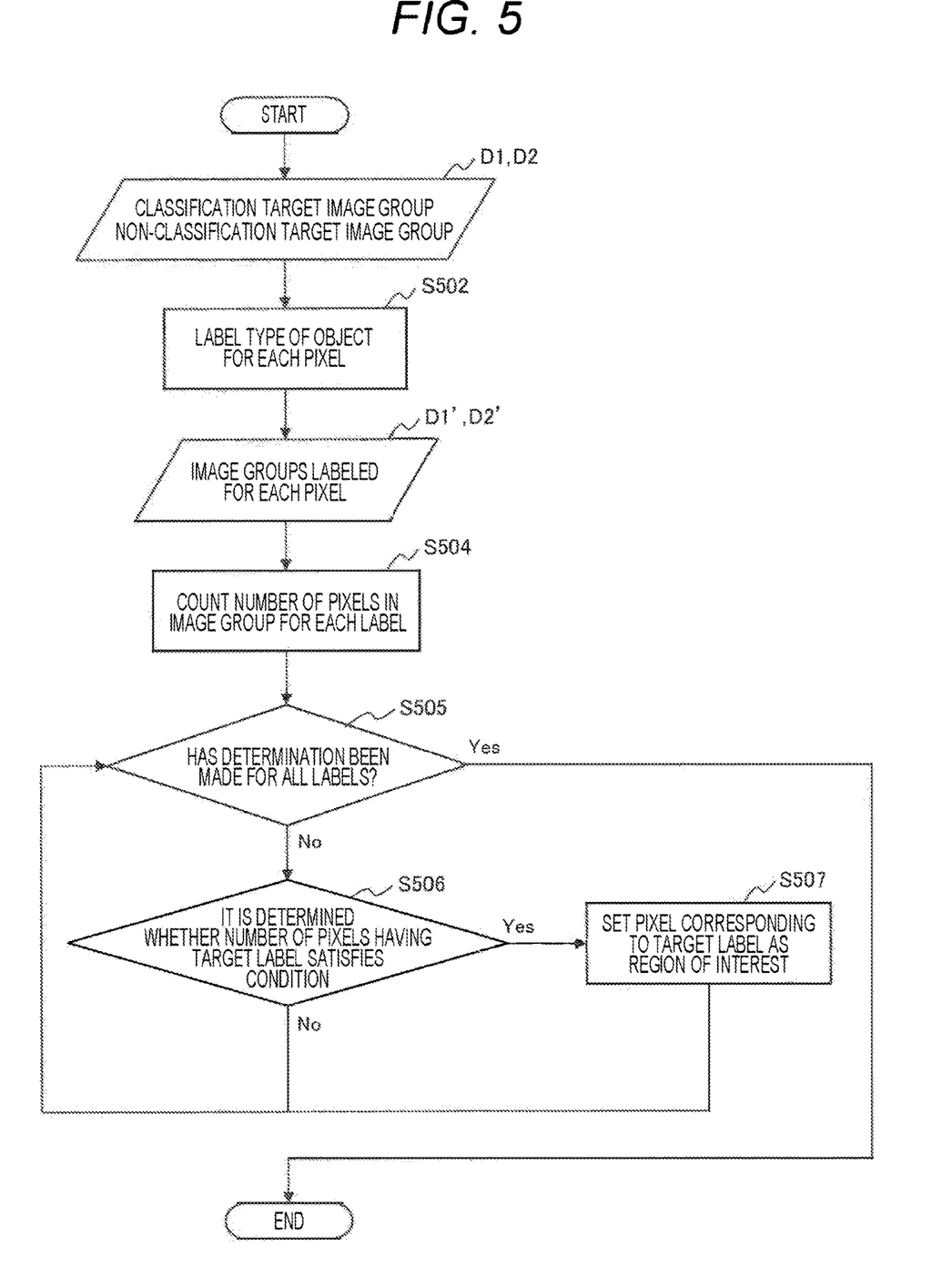
FIG. 5 is a diagram illustrating a detailed processing flow of processing in processing step S302 of FIG. 3.

FIG. 5 is a diagram illustrating a detailed processing flow of the above processing in processing step S302 of FIG. 3. FIG. 5 illustrates a program for setting an attention region by using a ratio of pixels occupied by an object to be focused in an image as an example of automatically setting the attention region.

In the processing step S502 of FIG. 5, the type of the object is labeled for each pixel in the minute region with respect to each image in the classification target image group D1 and the non-classification target image group D2. At this time, it is preferable to use a model used in Sementec Segmentation, which is a task of classifying labels of objects for each pixel.

Using a classification target image group D1' and a non-classification target image group D2' labeled for each pixel, the number of pixels in the image group for each label is counted in processing step S504. Next, in processing step S505, whether or not determination for all the labels has been made is confirmed, and when the determination for all the labels has been made (Yes), a series of pieces of processing is terminated. When there is an undetermined label (No), processing of processing step S506 is executed. As a result, the processing in and after processing step S505 is repeatedly performed for each label. Hereinafter, a label targeted in the current loop is called a target label.

In processing step S506, it is determined whether or not the number of pixels having the target label satisfies a condition (for example, a predetermined number or less), and when the condition is satisfied (Yes), the pixel having the target label is set as an attention region in processing step S507. When the condition is not satisfied (No), the process returns to processing step S505, and it is confirmed that the determination of the target label has been completed. This processing can be performed on all the labels, and the pixels of all the images in the non-classification target image group D2 can be classified into the attention region or the other regions.

Figure 6A:
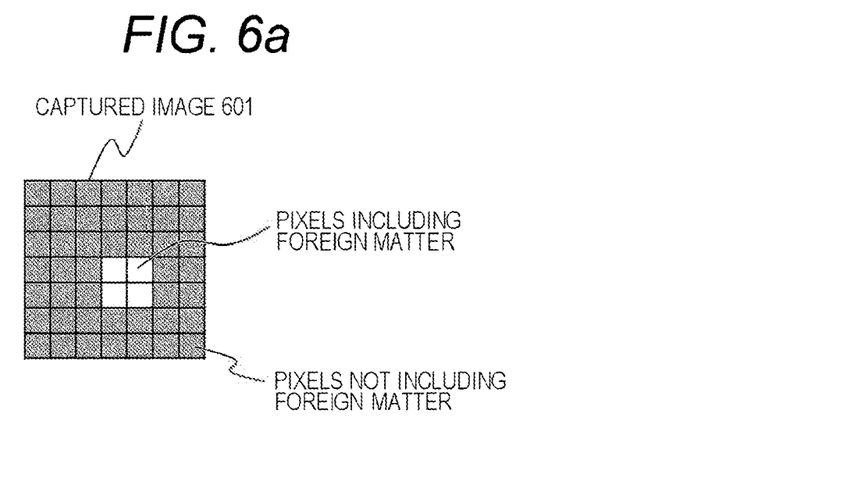
FIG. 6a is a diagram illustrating an example in which a proportion of foreign matter in a captured image in a foreign matter contamination inspection is small.
Figure 6B:
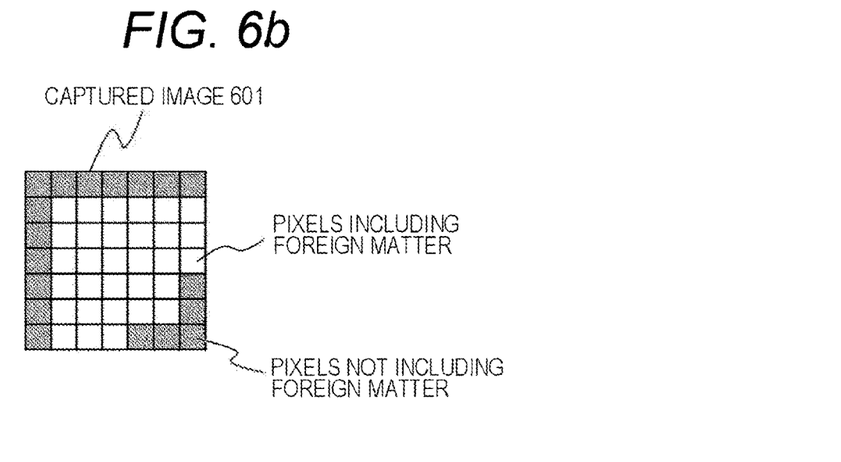
FIG. 6b is a diagram illustrating an example in which a proportion of foreign matter in a captured image in a foreign matter contamination inspection is large.

FIGS. 6a and 6b illustrate a captured image 601 in a foreign matter contamination inspection as a pixel group obtained by dividing the image into minute regions in a matrix. It is assumed that a white part is a foreign matter, and the other pixels do not include a foreign matter.

In processing step S506 of FIG. 5, for example, in a case where it is known that a proportion of the foreign matter in the image is small as illustrated in FIG. 6a in the image 601 in the foreign matter contamination inspection, it is determined whether the number of pixels of the target label is smaller than a threshold. Further, as illustrated in FIG. 6b, in a case where it is known that the foreign matter occupies a large proportion in the image, it is determined whether the number of pixels of the target label is larger than a threshold.

Next, processing contents in processing step S304 in FIG. 3 will be described with reference to FIGS. 7a and 7b. In processing step S304 of FIG. 3, the information D3 of the feature is clustered.

At this time, for example, a method of designating the number of clusters to be divided such as K-means may be used, or a method of not designating the number of clusters to be divided such as hierarchical cluster analysis may be used. Further, processing steps S302 and S304 may be performed by one algorithm. For example, a method may be used in which features are extracted by a CNN such as an unsupervised clustering method using a CNN, and a clustering result of the features is learned by using pseudo teaching information. The type of clustering method is not limited.

At this time, it is also conceivable that the feature of the classification target image group D1 is extracted, a radius of the smallest circle or sphere including the feature is defined as granularity, and the feature having the granularity similar to that of the classification target image group D1 can be extracted.

A case of division into subclasses focusing on the granularity at the time of clustering will be described with reference to FIGS. 7a and 7b. FIGS. 7a and 7b are examples of a case where the feature extracted from the image group of FIG. 2 can be expressed on a coordinate system of a two-dimensional vector. FIGS. 7a and 7b illustrate before and after division into subclasses, respectively.

Figure 7A:
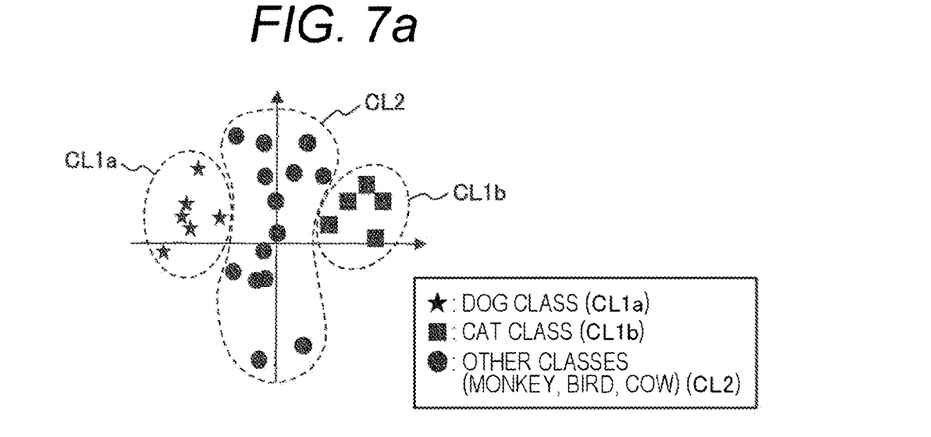
FIG. 7a is a diagram illustrating an example of a feature distribution before being divided into subclasses.

In a two-dimensional plane of FIG. 7a illustrating an example of a feature distribution before being divided into the subclasses, it is assumed that the dog class CL1a and the cat class CL1b are set as the target class CL1, the dog class CL1a exists in the first quadrant on the plane, and the cat class CL1b exists in the second quadrant on the plane. On the other hand, in a case where the others class is set as the non-classification target class CL2, the features of the others class are non-uniformly present on a vertical axis near the origin, and do not illustrate a clear tendency such as appearing in a specific quadrant, for example.

In the two-dimensional plane of FIG. 7a, the granularity of the feature is represented by the size of a symbol, and star marks of the dog class CL1a are displayed small, whereas square marks of the cat class CL1b are displayed large. In this case, it is possible to obtain a statistical value of the granularity of the classification target class CL2 from a radius of the sphere (circle in two dimensions) including the feature of the dog class CL1a and a radius of the sphere including the feature of the cat class CL1b, and to divide the others class based on the statistical value.

Figure 7B:
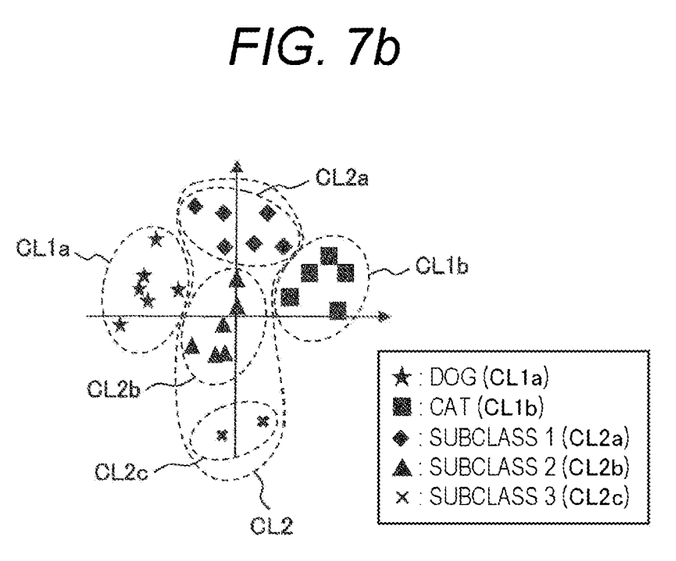
FIG. 7b is a diagram illustrating an example of a feature distribution after being divided into subclasses.

FIG. 7b illustrating an example of a feature distribution after being divided into the subclasses is an example in which the others class CL2 is subclassified using the granularity of the classification target class CL1. It is indicated that the features of the others class CL2 are non-uniformly present on the vertical axis near the origin, but can be divided into a subclass 1 (CL2a) located in an upper part of the vertical axis near the origin, a subclass 2 (CL2b) located in the vicinity of the origin, and a subclass 3 (CL2c) located in a lower part of the vertical axis near the origin by classification using granularity information. Note that, here, it is assumed that all the classes are subclassified so that the granularities of all the classes are close.

Figure 4:
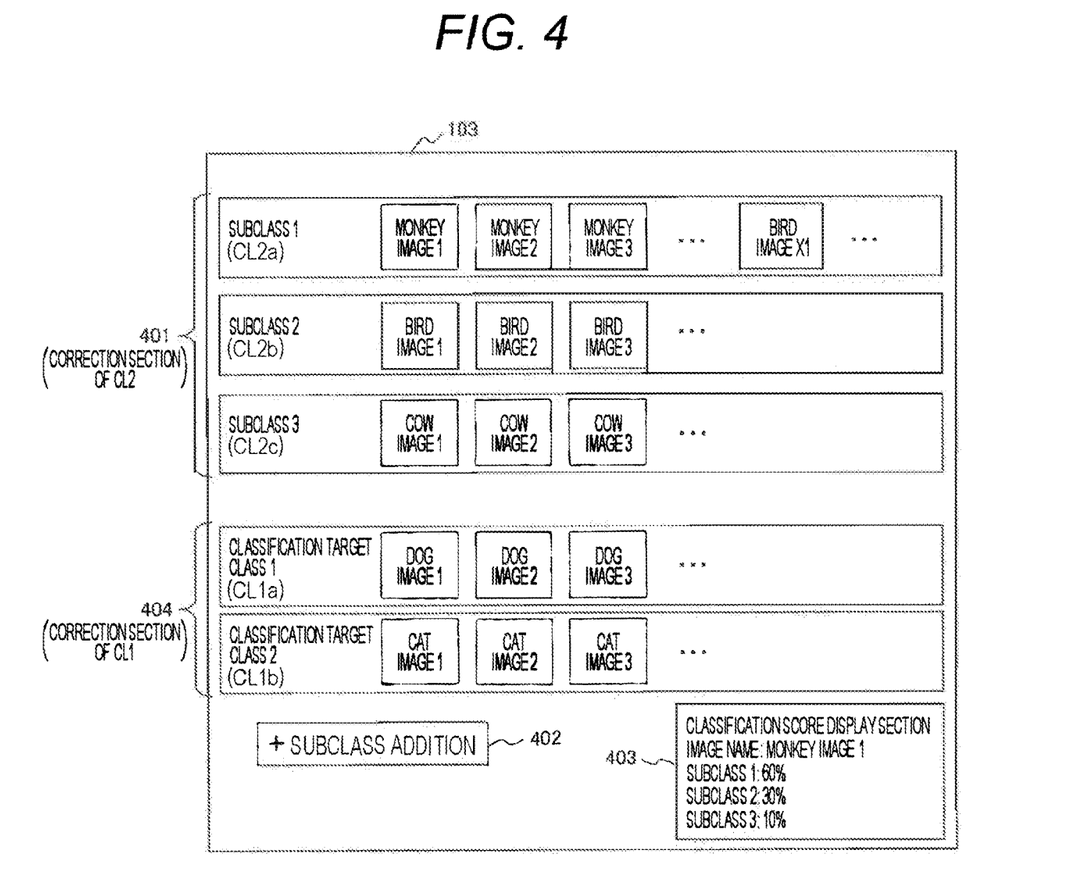
FIG. 4 is a diagram illustrating an example of a monitor screen in a result correction input unit 103.

FIG. 4 illustrates an example of a monitor screen in the result correction input unit 103. The monitor screen is roughly divided into four areas. An area 404 is a display area of the classification target class CL1, and images belonging to the dog class CL1a and the cat class CL1b are displayed according to the above example. An area 401 is a display area of the non-classification target class CL2, and images determined to belong to the monkey class CL2a, the bird class CL2b, and the cow class CL2c are displayed according to the above example. An area 402 is an area representing an operation button for a subclass addition function by the user. Further, in an area 403, for each image, basis data for classifying the image into the subclass is displayed.

The subclasses created by the subclassification unit 102 are displayed on the monitor screen of the subclass result display/correction section 401. Among them, the area 401 has a function of correcting the subclass result to a correct subclass by the user. For example, in a case where most of the images of the subclass 1 are monkey images and include the bird image X1, the user determines that the bird image X1 is erroneous and corrects the bird image X1 to the subclass 2 including many bird images. At this time, movement may be performed by dragging and dropping using a mouse, or movement may be performed by preparing a shortcut key or the like, and a correction method is not limited. Further, a subclass addition function 402 is provided for preparing a subclass other than the subclass displayed at the time of correction. Furthermore, since there is a possibility that the classification target class includes noise, the classification target class has a function of being correctable in the area 404.

In order to improve the efficiency of the user's correction work, the images are preferably displayed in order from the left with low reliability in the area 401. Regarding the reliability, for example, in a case where processing step S304 is K-means, a reciprocal of a distance from a center of a cluster to which the feature extracted from the image belongs is set as the reliability, and in a case of the clustering method using the CNN, a classification probability of the image is set as the reliability, and the images are displayed on a left side in order from the image with low reliability. Further, in a case where the feature of the classification target class is extracted, it is preferable that a distance from a spherical surface of the smallest sphere including the feature is set as the reliability, and the images are displayed on the left side in order from the image with low reliability in the area 404. That is, an arrangement of the images in the subclass may be determined according to the reliability of the incorporation of the images into the subclass when the images are classified into the subclass.

Furthermore, a classification score of the selected image is displayed in the area 403. At this time, a display position in the area 403 is not limited. For example, a pop-up may be displayed while a mouse is placed on the image. It can be said that this classification score displays basis information indicating that an image is incorporated into a subclass when the image is classified into the subclass.

In addition, for each image classified into a class or a subclass, it is preferable to cooperatively display feature parts of each image with respect to the feature that serves as a basis for determining that this image is appropriate to be classified into the class or the subclass.

Hereinafter, compact learning will be described in detail. The compact learning indicates learning in which a distribution of features is frequently collected for each class. Advantages of the compact learning will be described with reference to FIGS. 7*a* and 7*b* as examples.

Generally, in image classification using teaching data, learning is performed such that a classification probability increases up to a granularity range for each class. The granularity of the others class CL2 in FIG. 7*a* is large, and the classification probability of CL2 into the others class becomes large with respect to the features of the dog class CL1a and the cat class CL1b, and there is a possibility of erroneous classification. Therefore, if the others class CL2 is divided into subclasses as illustrated in FIG. 7*b*, with respect to the features of the dog class and the cat class, a classification probability into each subclass is small, and improvement in accuracy can be expected.

According to the present embodiment, the non-classification target class CL2 can be divided into subclasses that enable automatic and compact learning.

REFERENCE SIGNS LIST

100 image classification device
101 learning image input unit
102 subclassification unit
103 result correction input unit

The invention claimed is:

1. An image classification device that performs image classification using images of a classification target class that include teaching information, and images of a non-classification target class to which the teaching information is not assigned, the image classification device comprising:
   an image group input unit that inputs an image group belonging to the classification target class and an image group belonging to the non-classification target class; and
   a subclassification unit that extracts features for images in the image group, clusters the features of the images for the image group belonging to the non-classification target class, and divides the image group into subclasses.

2. The image classification device according to claim 1, further comprising a result correction input unit including a display unit, wherein the image group belonging to the classification target class and the image group belonging to the non-classification target class are separately displayed on the display unit as image groups belonging to the divided subclasses, and class correction of a displayed image is enabled.

3. The image classification device according to claim 1, wherein
   when extracting the features of the images, the subclassification unit subdivides entirety of each image into minute regions, quantifies pixel that is a subdivided small region by labeling, and clarifies the feature in the image and a region indicating the feature by identification using the quantified value.

4. The image classification device according to claim 1, wherein
   when clustering the features of the images, the subclassification unit defines a radius of a minimum circle or sphere including each of the features as a granularity, and forms a subclass according to the granularity.

5. The image classification device according to claim 2, wherein the display unit of the result correction input unit includes a new subclass setting unit.

6. The image classification device according to claim 2, wherein
   the display unit of the result correction input unit includes a classification score display unit that displays basis information of incorporation of an image into a subclass when the image is classified into the subclass.

7. The image classification device according to claim 2, wherein
   an arrangement of images in a subclass is determined and displayed on the display unit of the result correction input unit according to reliability of incorporation of an image into a subclass when the image is classified into the subclass.

8. The image classification device according to claim 2, wherein
   the display unit of the result correction input unit displays, for each image classified into a class or a subclass, a feature part of each image for a feature that is a basis for determining that it is appropriate to classify the image into the class or the subclass.

9. The image classification device according to claim 1, wherein
   the subclassification unit specifies a region of interest in a non-classification target image in advance, and performs clustering based on the region.

10. The image classification device according to claim 1, wherein
the image group belonging to the classification target class provided by the image classification device and information of the image group, and an image group belonging to a divided subclass and information of the image group are provided as teaching data used in an image classification system having a learning function.

11. An image classification method for performing image classification using images of a classification target class that include teaching information, and images of a non-classification target class to which the teaching information is not assigned, the image classification method comprising:
extracting features for images of an image group belonging to the classification target class and an image group belonging to the non-classification target class, clustering the features of the images for the image group belonging to the non-classification target class, and dividing the image group into subclasses.

* * * * *